Feb. 8, 1966     G. E. NUTILE ET AL     3,233,366
APPARATUS FOR GERMINATING SEEDS
Filed July 26, 1963
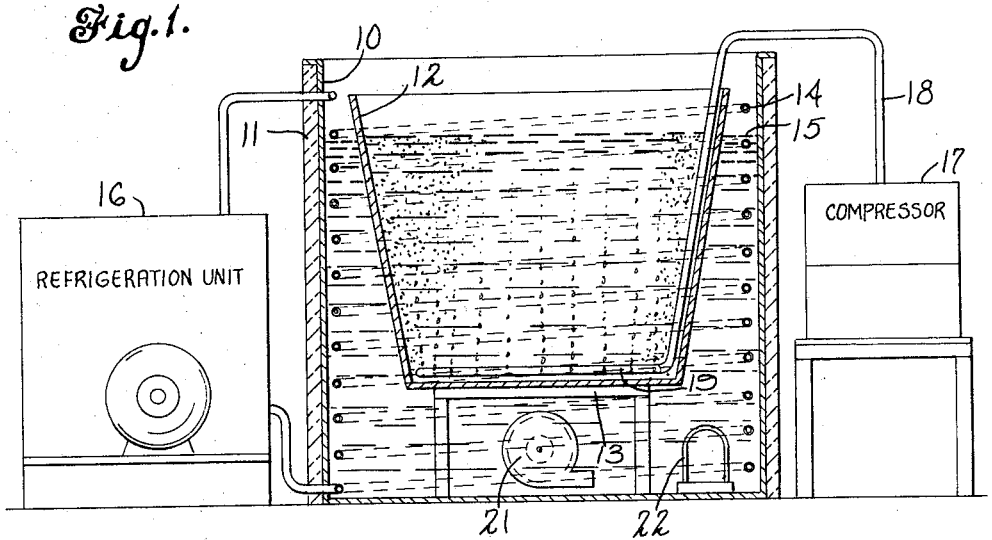
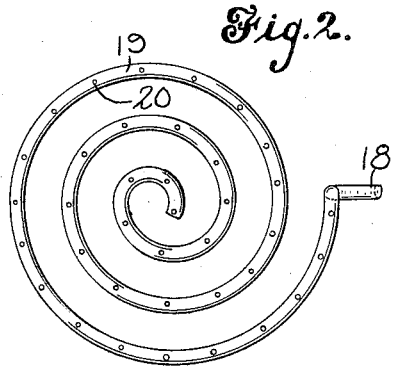
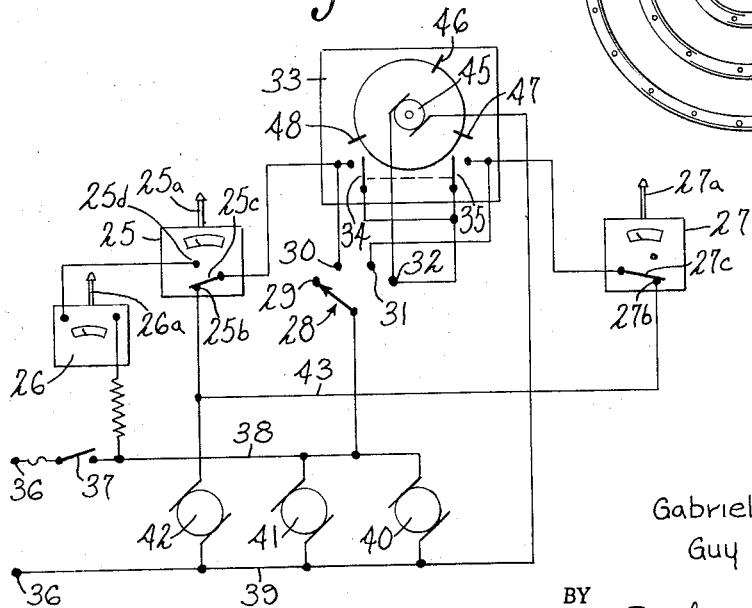
INVENTORS
Gabriel E. Nutile
Guy Matsuoka
BY Rockwell & DeLio
ATTORNEYS United States Patent Office 3,233,366
Patented Feb. 8, 1966

3,233,366
APPARATUS FOR GERMINATING SEEDS
Gabriel E. Nutile and Guy Matsuoka, Twin Falls, Idaho, assignors to Asgrow Seed Company, New Haven, Conn.
Filed July 26, 1963, Ser. No. 297,839
5 Claims. (Cl. 47—16)

This invention relates to germination of seeds prior to sowing such seeds for the production of agricultural crops and apparatus therefor.

Planting of pre-germinated seeds provides several advantages including more uniform and faster seedling emergence, which reduces the hazards of seed destruction by soil borne fungi, bacteria and insects. Planting pre-germinated seeds also permits early cultivation for weed control and more uniform maturity of the crop, which results in lower harvesting costs. Moreover, germination of seeds prior to planting makes possible seedling emergence in soils at temperatures which would induce dormancy in dry seeds. As used herein, the term "pre-germination" refers to germination of seeds prior to planting or sowing.

Previous techniques for germinating seeds prior to planting have included the spreading of the seeds on moist substrata such as paper or cloth toweling, sand or gravel, or by placing the seeds on trays or in containers which are watered and drained at periodic intervals. In all of the known prior art techniques of pre-germinating seeds it has ben necessary to moisten the seeds or submerge them in water and then at periodic intervals to remove the water to allow the seeds to have access to oxygen, necessary for germination of the seeds.

The present invention provides a method and apparatus for germinating seeds in water without the necessity of changing the water at periodic intervals, and a convenient procedure and apparatus for germinating large quantities of seed in a small area at minimum cost for equipment and operation. The invention also provides establishment and means for establishment of conditions required to break the dormancy of seeds. The invention further provides for the germination of seeds in water in which the water is continuously or periodically aerated to supply oxygen to the seeds for germination thereof and to prevent any accumulation of harmful metabolic products produced by the fast rate of respiration during germination. Moreover, the invention ensures that the seeds to be germinated while submerged in water are constantly agitated to thus assure an adequate supply of oxygen for each seed. The invention further provides for interrupting and preventing seeds from further germination and holding the seeds in a pre-germinated condition for a pre-determined period of time before planting.

Accordingly, it is an object of this invention to provide a new and improved method of pre-germinating seeds.

Another object of this invention is to provide a new and improved method of pre-germinating seeds in water without the necessity of changing the water at periodic intervals.

Another object of this invention is to provide a new and improved method of germinating seeds in water which includes continuously aerating the water with the seeds therein.

A further object of this invention is to provide new and improved apparatus for pre-germinating seeds.

A still further object of this invention is to provide a new and improved apparatus for pre-germinating seeds having means for establishing a program for breaking dormancy of the seeds, pre-germinating the seeds and then holding the seeds in a germinated state prior to planting.

The features of the invention which are believed to be novel are set forth with particularity in the claims appended to and forming part of this specification. However, the invention both as to its organization and operation, together with further objects and advantages thereof may best be appreciated by reference to the following detailed description taken in connection with the drawings wherein:

FIG. 1 illustrates, partly in section, an elevation of apparatus embodying, and for practicing the invention;

FIG. 2 illustrates part of the aerator apparatus of FIG. 1; and

FIG. 3 schematically illustrates an electrical network for controlling the apparatus of FIG. 1.

A preferred apparatus embodying the invention comprises a container 10 having a jacket 11 of insulating material such as fiberglass thereabout. Disposed within container 10 is a second container or germinating tank 12 supported on a base member 13 on the bottom of container 10. Disposed on the inner periphery of container 10 by means such as welding is a refrigeration coil 14 adapted to have a coolant circulated therethrough to control the temperature of a liquid 15 of good heat transfer capabilities in container 10. Liquid 15 may be water. Coil 14 is connected to refrigerating apparatus or unit 16 of any suitable type, illustrated in block form.

The apparatus further comprises a compressor 17 which supplies air through a conduit 18 to an aeration or aspirating coil 19 disposed in the bottom of germinating tank 12. As more clearly seen in FIG. 2 aspirating coil 19 is spiral in form, sealed at the free end thereof, and has a plurality of apertures 20 defined therein at spaced intervals along its length. The coil 19 may be covered with a small mesh fiberglass screen to prevent small seeds from entering apertures 20. Preferably, the apertures 20 in the aspirator coil are directed toward the bottom of germinating tank 10 to agitate and enhance aeration of the seeds.

Disposed within container 10 and for convenience placed beneath stand 13 is a submersible electrically driven pump 21 which circulates liquid in the container 10 to keep the temperature thereof uniform. Also placed within tank 10 is a heating element 22 to aid in regulating the temperature of the heat transfer liquid as hereinafter described.

In accordance with the invention germinating tank 12 is filled with water to a depth of several inches from the rim thereof. The level of the heat transfer liquid of container 10 is made to be about even with the water level of germanating tank 12.

The seeds to be germinated, approximately ¾ to 1 lb. per gallon of water, are placed in the water in the germinating tank. When the compressor 17 is rendered operative, air is forced into the aspirating coil 19 and the air exiting from the aspirating coil through the apertures 20 aerates the water and additionally agitates the seeds to assure an adequate supply of oxygen for each seed.

The germinating program may be accomplished in one or more of three stages as the case requires, namely, breaking dormancy of the seeds; sprouting; and holding. The invention provides conditions required to break the dormancy of seeds of certain crops. Some seed crops, for example, lettuce and cabbage require a low temperature (40° F.–45° F.) period in the imbibed or moist state before germination can occur at a higher temperature normally favorable for germination.

The disclosed apparatus as hereinafter described may be set to chill the water for a predetermined period to break seed dormancy after which the temperature may be automatically increased and held at a level favorable for germination. The invention further provides means to delay further growth of germinated seeds should it become necessary, as might be the case if unfavorable weather conditions interfered with planting schedules. For such situations the temperature of the heat transfer liquid 15 can be lowered to a holding temperature and maintained for several days without injury to the germinating seeds.

In accordance with the invention means are provided to control the temperature of heat transfer liquid 15 and thereby control the temperature level of the water in germinating tank 12. Such means may be operated semi-automatically to determine a dormancy breaking period, a sprouting period and a holding period. The control means may also be programmed to place seeds tank 12 in a dormancy breaking state for a predetermined length of time after which the temperature of the liquid 15 is raised to a level favorable for germination, and subsequent to germination the temperature of water in tank 12 may be lowered to hold the seeds from further germination, if necessary, as might be the case if weather conditions were unsuitable for planting of the seeds.

A preferred control means illustrated in FIG. 3 comprises a first sprouting or germinating thermostat 25 having a temperature sensing eleemnt 25a adapted to sense the temperature of liquid in tank 12 and control the operation of refrigeration unit 16 in response thereto, a second sprouting or germinating thermostat 26 having a temperature sensing element 26a adapted to sense the temperature of the liquid in tank 12 and control the operation of heater 22 in response thereto, and a third pre-chilling or holding thermostat 27 having a temperature sensing element 27a arranged to sense the temperature of liquid in tank 12 and control the operation of refrigeration unit 16 in response thereto to maintain the temperature of the seeds in a holding state to prevent further germination of the seeds. Thermostat 27 is utilized to regulate the temperature of water in tank 12 both for pre-chilling to break dormancy and for holding seeds from further germination. The network of FIG. 3 further comprises a selector switch 28 connectible to contacts 29, 30, 31 and 32 for purposes hereinafter explained. The control means of FIG. 3 further includes a timer or clock 33 arranged to operate switches 34 and 35 when the germinating apparatus of FIG. 1 is operated on a predetermined program. Electrical energy is adapted to be supplied to the network of FIG. 3 through terminals 36 through a master off-on switch 37. Connected across terminals 36 at lines 38 and 39 are air compressor motor 40 and circulation pump motor 41, refrigeration unit motor 42 has one terminal thereof connected to line 39 and the other terminal thereof connected to a line 43 which is connected between contacts 25b and 27b of the switches 25c and 27c of thermostats 25 and 27, respectively.

In operation when master off-on switch 37 is closed air compressor motor 40 and water circulation pump motor 41 are energized and air is forced through aeration coil 19 and the apertures 20 therein downwardly toward the bottom of tank 12 to aerate and agitate seeds placed therein. Additionally pump 21 circulates the heat transfer fluid 15 in tank 10 to maintain a uniform temperature thereof.

Let it be assumed that it is desired to raise the heat transfer liquid 15 to a germinating temperature, for example, sixty degrees. Thermostat 25, controlling the operation of refrigeration unit motor 42, may be set at slightly above sixty degrees and thermostat 26, controlling the operation of heating element 22 set at slightly below sixty degrees. When the contact arm of switch 28 is moved from off contact 29 to contact 30 a circuit is established from line 38 through switch arm 28 and thermostatic switch 25c, and through refrigeration unit motor 42 to line 39. The refrigeration unit is then brought into operation and refrigerant is circulated through coils 14 to bring the temperature of heat transfer liquid 15 and the liquid in tank 12 to the desired level. Should the temperature of the liquid in tank 12 fall to below a predetermined level a decrease in temperature will be sensed by sensing unit 25a of thermostat 25 which will move switch 25c to contact 25d and complete an electrical circuit to thermostat 26 and heater 22 controlled thereby. Thereafter the thermostats 25 and 26 will control the operation of the refrigerating units 16 and heater 22 cyclically to hold the temperature of the heat transfer liquid and liquid in tank 12 within a selected range about the desired temperature level.

If it should be desired to halt germination of seeds in tank 12 to hold or temporarily halt germination, the contact arm of switch 28 may be moved to contact 31 which completes a circuit including pre-chilling or holding thermostat 27 and refrigeration unit motor 42. Thereafter, thermostat 27 will operate to control operation of refrigeration unit 16 to maintain the temperature of heat transfer liquid 15 and therefore the temperature of the liquid in tank 12 below a predetermined temperature to prevent further germination of the seeds in tank 12. Alternatively, thermostat 27 may be utilized to hold the seedlings in tank 12 at or below a predetermined temperature to break dormancy of the seeds prior to germination thereof. If desired a heater control thermostat may be associated with thermostat 27 in the same manner that thermostat 26 is associated with thermostat 25 to maintain a predetermined range of pre-chilling or holding temperature.

To automatically program a germination cycle the contact arm of switch 28 is placed at contact 32. With contact arm of switch 28 in this position it will be seen that the thermostats 25, 26 and 27 may be rendered operative only when switches 34 and 35 are in a predetermined position.

The timer or clock 33 in a preferred form comprises a synchronous motor 45 energized to drive the timing elements when contact arm of switch 28 is placed at terminal 32. The dial or other moving element of timer 33 which may be a seven-day or longer clock has a plurality of switch tripping elements indicated as 46, 47 and 48, positionable thereon to operate switches 34 and 35 in a predetermined time sequence. The switches 34 and 35 are arranged such that one is open when the other is closed and vice versa. To initiate an automatic germination program the tripping elements 46, 47 and 48 are placed in predetermined positions to actuate switches 34 and 35 after passage of pre-selected intervals of time. To go through a full cycle of operation, one of the tripping elements 47 may be set so that after a predetermined interval of time after initiation of a cycle tripping element 47 will close switch 34 and open switch 35 to interrupt a dormancy breaking state at a temperature set by thermostat 27, and initiate a germinating state for a predetermined period of time. Thereafter, tripping element 46 may be set so that after a predetermined interval of time, element 46 will again close switch 35 and initiate a holding period at a lower temperature which interrupts and halts germination of the seeds in tank 12. Tripping element 48 and also other tripping elements, not shown, dependent on weather conditions or other considerations, may be set to interrupt germination and initiate a holding state and then again initiate germination dependent on the placement of the tripping elements on the movable portion or dial of timer 33.

The invention has been utilized and implemented with a number of different vegetable seeds for germination thereof before planting and the seeds then held in the germinated state for a period of time as exemplified by the following Table I.

TABLE I

*Satisfactory sprouting and holding temperatures*

| Kind of Seed | Sprouting temperature, °F. | Germinating or Sprouting time | Holding temperature, °F. | Days held without injury to Sprouts |
|---|---|---|---|---|
| Lettuce | 60 | 30-40 hours | 40 | 7 |
| Tomato | 77 | 65-70 hours | 50 | 2 |
| Cucumber | 77 | 25-30 hours | 50 | 4 |
| Carrot | 77 | 65-75 hours | 50 | 2 |
| Cabbage | 68 | 48-55 hours | 40 | 5 |
| Mustard | 68 | 48-55 hours | 40 | 7 |
| Pepper | 85 | 4 to 5 days | } Cannot hold without injury. | |
| Squash | 77 | 3 days | | |
| Celery { 55° F. for 16 hrs. 77° F. for 8 hrs. daily alternation | | 6 to 7 days | 40 | 2 |

Table II below shows how the invention may be advantageously used to break dormancy in seeds prior to germinating the seeds.

TABLE II

*Examples of breaking dormancy*

| Kind of Seed | Percentage germination of seeds at temperature satisfactory for non-dormant seeds. | Percentage germination after chilling 96 hours at 50° F., then raising water temperature to 68° F. and aerating. |
|---|---|---|
| Mustard | 42% in 96 hours at 68° F. | 82% in 32 hours. |
| Lettuce | 67% in 72 hours at 68° F. | 93% in 15 hours. |

Germinated seeds suitable for planting or sowing are easily recoverable by removing germinating tank 12 from container 10 and pouring the water with the germinated seeds therein over a screen with sufficient mesh to retain the germinated seeds.

Sprouted seeds are usually at their best for planting when the radical or young root is about 1/16" in length. The time required for germination in aerated water to a satisfactory stage for planting in soil, as illustrated in Table I, will vary with the temperature, the type of seed, and to a smaller extent, with different seed lots.

It is essential to have the water in the germinating or sprouting tank 12 aerated during operation of the equipment. Seeds, except for those of certain-aquatic plants, will not germinate without a free supply of oxygen. Aeration of the water in tank 12 is also required to prevent dying of the sprouted seeds during the holding period subsequent to the germinating or sprouting period.

The invention may further be utilized to provide normal germination for seeds deficient in certain elements. Some seeds if grown in soil deficient in an element necessary to normal development thereof do not assimilate a sufficient amount of that element for normal germination and upon germination thereof the element deficiency inhibits growth of the seedling and causes abnormal development of the terminal bud or shoot. For example, a necessary element for normal development of pea seeds is boron and a deficiency of boron in the soil in which a pea seed crop is grown causes abnormal development of the seed upon germination thereof.

In accordance with the invention if seeds from a seed crop grown in soil deficient in a particular element are to be germinated in tank 12 a small amount of the deficient element may be put in solution with the water in tank 12 to supply the deficiency of the seeds in that element and thereby aid normal growth of the seeds. Again for example, assuming that pea seeds resulting from a seed crop grown in soil deficient in boron are placed in tank 12 for germination thereof, to aid normal development of the seeds during germination and growth subsequent thereto borax may be added to the water in tank 12 so that the seeds upon germination thereof may assimilate sufficient boron for normal germination in tank 12.

While a preferred method of practicing the invention together with a preferred apparatus therefor has been described and illustrated for purposes of disclosure, modifications to the disclosed embodiments of the invention as well as other embodiments thereof may occur to those skilled in the art which do not depart from the spirit and scope of the invention. Accordingly the appended claims are intended to cover all modifications of the disclosed embodiments of the invention as well as other embodiments thereof which do not depart from the spirit and scope of the invention.

What is claimed is:

1. Apparatus for germinating seeds comprising a first container, a heat transfer medium in said first container, a second imperforate container supported concentrically in said first container so that said heat transfer medium surrounds a portion of the sidewall and the bottom area of said second container and regulates the temperature in said second container, a germinating liquid in said second container separate from said heat transfer medium, a source of air, conduit means directing said air from said source into said germinating liquid, cooling means having cooling coils positioned in said first container for lowering the temperature of said heat transfer medium, heating means having a heating element positioned in said first container to raise the temperature of said heat transfer medium and control means for regulating said cooling means and said heating means.

2. The apparatus of claim 1 in which circulating means is positioned in said first container and is operative to circulate said heat transfer medium to maintain said medium at a constant temperature throughout.

3. The apparatus of claim 1 in which said conduit means is perforated and coiled at one end which is positioned in said liquid, said perforations being directed downwardly toward the bottom of said second container to agitate and aerate seeds positioned in said liquid.

4. The apparatus of claim 1 in which said control means includes a first thermostat and temperature sensing element connected to said cooling means and said heat transfer medium, a second thermostat and temperature sensing element connected to said heating means and heat transfer medium, said first and second thermostats and sensing elements being operative to maintain said heat transfer medium within a controlled temperature range by selective actuation of said heating and cooling means.

5. The apparatus of claim 1 including a third thermostat and temperature sensing element connected between said cooling means and said heat transfer medium, and automatic control means connected to said thermostats to automatically selectively actuate said heating means and cooling means to vary the temperature of said heat transfer medium and hold selected temperature levels of said heat transfer medium for predetermined periods of time.

References Cited by the Examiner

UNITED STATES PATENTS

| | | | |
|---|---|---|---|
| 1,616,125 | 2/1927 | Holman | 119—5 X |
| 2,198,150 | 4/1940 | Barnhart | 47—1.2 |
| 2,522,798 | 9/1950 | Persha | 47—14 |
| 2,594,474 | 4/1952 | McGrath | 119—5 |
| 2,696,800 | 12/1954 | Rork | 119—5 |
| 3,103,763 | 9/1963 | Malchair | 47—1.2 |
| 3,131,064 | 4/1964 | Malchair | 47—1.2 X |

FOREIGN PATENTS

| | | |
|---|---|---|
| 29,425 | 8/1907 | Austria. |
| 46,996 | 8/1936 | France. |
| | | (Add. to Pat. No. 782,229) |
| 146,073 | 11/1903 | Germany. |
| 744,200 | 2/1956 | Great Britain. |

OTHER REFERENCES

Popular Science Monthly, vol. 134, No. 4, April 1939, pages 144–147, article "Secrets of Successful Tank Farming," Q. 1. P8.

ABRAHAM G. STONE, *Primary Examiner.*

T. GRAHAM CRAVER, *Examiner.*